US007680781B1

(12) United States Patent
Wasserman et al.

(10) Patent No.: US 7,680,781 B1
(45) Date of Patent: Mar. 16, 2010

(54) AUTOMATIC SEARCH QUERY GENERATION AND RESULTS SET MANAGEMENT

(75) Inventors: Brian J. Wasserman, Escondido, CA (US); George R. Hood, San Diego, CA (US); Thomas K. Ryan, Valley Center, CA (US)

(73) Assignee: Teradata US, Inc., Miamisburg, OH (US)

( * ) Notice: Subject to any disclaimer, the term of this patent is extended or adjusted under 35 U.S.C. 154(b) by 764 days.

(21) Appl. No.: 11/072,623

(22) Filed: Mar. 4, 2005

(51) Int. Cl.
*G06F 17/30* (2006.01)

(52) U.S. Cl. .......................................................... 707/4

(58) Field of Classification Search ....................... None
See application file for complete search history.

(56) References Cited

U.S. PATENT DOCUMENTS

| | | | | |
|---|---|---|---|---|
| 4,829,427 | A | 5/1989 | Green | |
| 5,519,859 | A | 5/1996 | Grace | |
| 5,548,755 | A * | 8/1996 | Leung et al. | 707/2 |
| 5,659,728 | A | 8/1997 | Bhargava et al. | |
| 5,664,173 | A | 9/1997 | Fast | |
| 5,696,960 | A | 12/1997 | Bhargava et al. | |
| 5,764,973 | A | 6/1998 | Lunceford et al. | |
| 5,829,006 | A | 10/1998 | Parvathaneny et al. | |
| 5,850,544 | A | 12/1998 | Parvathaneny et al. | |
| 5,890,148 | A | 3/1999 | Bhargava et al. | |
| 5,940,819 | A * | 8/1999 | Beavin et al. | 707/2 |
| 5,970,482 | A * | 10/1999 | Pham et al. | 706/16 |
| 6,023,696 | A * | 2/2000 | Osborn et al. | 707/3 |
| 6,032,144 | A * | 2/2000 | Srivastava et al. | 707/3 |
| 6,192,357 | B1 | 2/2001 | Krychniak | |
| 6,199,195 | B1 * | 3/2001 | Goodwin et al. | 717/104 |
| 6,341,277 | B1 * | 1/2002 | Coden et al. | 707/2 |
| 6,571,232 | B1 * | 5/2003 | Goldberg et al. | 707/2 |
| 6,578,028 | B2 | 6/2003 | Egilsson et al. | |
| 6,609,123 | B1 * | 8/2003 | Cazemier et al. | 707/4 |
| 6,651,055 | B1 | 11/2003 | Kilmer et al. | |
| 6,711,565 | B1 * | 3/2004 | Subramaniam et al. | 707/3 |
| 6,748,374 | B1 | 6/2004 | Madan et al. | |
| 6,839,724 | B2 * | 1/2005 | Manchanda et al. | 707/203 |
| 6,925,595 | B1 * | 8/2005 | Whitledge et al. | 715/513 |
| 6,976,029 | B2 * | 12/2005 | Venkatesh et al. | 707/102 |
| 7,110,997 | B1 * | 9/2006 | Turkel et al. | 707/3 |
| 7,152,073 | B2 * | 12/2006 | Gudbjartsson et al. | 707/102 |
| 2003/0033287 | A1 * | 2/2003 | Shanahan et al. | 707/3 |
| 2003/0126136 | A1 * | 7/2003 | Omoigui | 707/10 |
| 2003/0212666 | A1 * | 11/2003 | Basu et al. | 707/3 |
| 2004/0030688 | A1 * | 2/2004 | Aridor et al. | 707/3 |
| 2005/0060290 | A1 * | 3/2005 | Herscovici et al. | 707/3 |

OTHER PUBLICATIONS

David S. Platt, Introducing Microsoft.NET, 2002, Microsoft Press, 2nd Edition, Chapter 9.*

* cited by examiner

*Primary Examiner*—Neveen Abel Jalil
*Assistant Examiner*—Mark Andrew X Radtke
(74) *Attorney, Agent, or Firm*—Schwegman, Lundberg & Woessner

(57) ABSTRACT

Techniques are presented for automatic search query generation and results set management. A searcher makes selections from metadata; the metadata is associated with a particular lexicon or industry. Furthermore, the selections are mapped to fields associated with a data source. A thread-safe or unique search query is generated in response to the fields. The thread-safe search query is in a query language format which can query the data source. In an embodiment, the thread-safe search query is executed against the data source and the results returned are customized to rank the results, to sort the results, to filter the results, and/or to acquire a random sampling of the results.

13 Claims, 4 Drawing Sheets

AUTOMATIC SEARCH QUERY GENERATION AND RESULTS SET MANAGEMENT

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screen shots which may be described below and in the drawings that form a part of this document: Copyright ©2005, NCR Corp. All Rights Reserved.

FIELD

The invention relates generally to data searching, and more particularly to techniques for automatically generating search queries and techniques for managing results sets returned from those search queries.

BACKGROUND

Database programmers or administrators (DBAs) are skilled in the language and techniques of database query languages and database design. As a result, DBAs can rapidly and efficiently construct search queries for a given database. However, DBAs often lack an understanding of specific industry data and its topology and/or lexicon.

For example, the legal industry will have their data organized according to its meaning and topology, which are readily recognized by lawyers. Moreover, the data itself will conform to a vocabulary (lexicon) used within the legal industry. Conversely, the health care industry will have their data organized differently and will use different vocabularies from that which are used within the legal industry.

Analysts or professionals within a particular industry are adept at understanding the data and its inter-relationships. Thus, analysts will often have to interface with DBAs for purposes of creating useful and meaningful searches that are translated into a query language format for purposes of searching a database. The DBA provides the technical expertise for interacting with the database, and the analyst provides the technical expertise for understanding the data within the database and its meaning to a particular industry.

It is apparent that generally two separate resources are needed to effectively access and utilize industry data contained within an electronic database. This coordination presents challenges for an enterprise because the schedules and workloads of each resource may hinder timely development of search queries. Additionally, dual resources for a single task (e.g., search generation) are more expensive than having a single resource.

Additionally, often the data within the database is voluminous and any search executed against the database may therefore produce too many results. In other words, an analyst may need to further enlist the services of a DBA for purposes of filtering or organizing search results into a more meaningful subset of results. This further delays a project within an enterprise, unduly ties up a DBA, and adds additional expense for the enterprise.

It is therefore desirable to have improved techniques for assembling or generating search queries and for managing results sets associated with the execution of those search queries.

SUMMARY

In various embodiments, techniques for automatically generating a search query are provided. In an embodiment, Metadata associated with a lexicon of a particular industry is presented to a searcher. Metadata selections are received from the searcher and a thread safe data store query is generated. Next, the selections from the metadata are mapped to fields of a data store table, and the data store query is populated with the fields in a query language format of the data store table.

DETAILED DESCRIPTION

Figure 1:
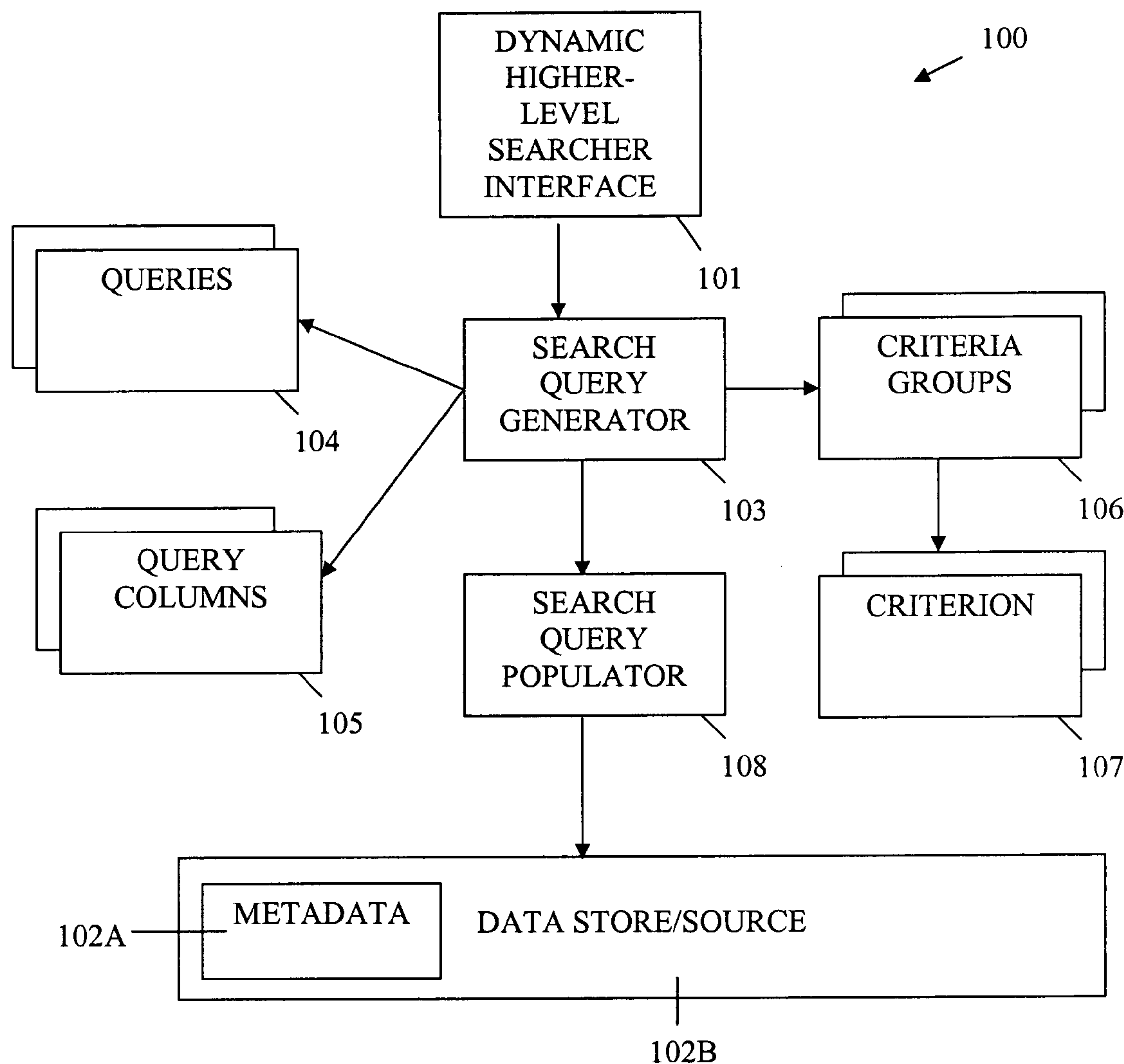
FIG. 1 is a diagram of a query generator and results set manager system, according to an example embodiment.

FIG. 1 is a diagram of a query generator and results set manager system 100, according to an example embodiment. The query generator and results set manager system 100 are implemented in a machine-accessible or computer-readable medium and is optionally accessible over a network. The network may be wired or wireless.

FIG. 1 is presented for purposes of illustration only and is not intended to limit embodiments of the query generator and results set manager system 100, since it is readily apparent that some components of the FIG. 1 may be subsumed into other components, that additional components may be added, and/or that some components may be deleted; all without departed from the beneficial teachings presented herein.

In an embodiment, the query generator and results set manager system 100 is implemented as an object-oriented (OO) architecture, such that components or entities associated with search queries and search results sets management are embodied as objects. The objects are local abstractions of the entities and they encapsulate features of the entities and include methods. Some methods are private and some are public. Public methods act as interfaces to the objects and permit multiple objects to interact with one another. According to an embodiment, the classes of the OO query generator and results set manager system 100 are implemented in JAVA. Although, it is apparent that any OO programming language may be used with the teachings presented herein.

The query generator and results set manager system 100 may be viewed as a searcher's interface. In other words, a searcher interacts with various components of the query generator and results set manager system 100 for purposes of automatically generating a search query and/or for purposes of better managing a results set returned from an executed search query.

The query generator and results set manager system 100 includes a dynamic higher-level searcher interface 101 (hereinafter "searcher interface"), metadata 102A, a data store or data source 102B (hereinafter "data store"), a search query generator 103, queries 104, query columns 105, criteria groups 106, multiple criterion 107, and a search query populator 108. Each of these will now be discussed in turn.

The searcher interface 101 interacts with a searcher for purposes of assisting an analyst in generating unique instances of queries through manipulation of other components of the query generator and results set manager system 100.

For example, an analyst, such as an insurance fraud adjuster, uses the searcher interface 101 to interact with other components of the query generator and results set manager system 100 for purposes of constructing searches and analyzing search results. This permits the insurance fraud adjuster to dynamically analyze historical claims data in real time to identify potential cases of insurance fraud. This can be done without enlisting the services of a DBA, and will be discussed more completely below.

A searcher includes any individual or automated application that interacts with the searcher interface 101. In one embodiment, the searcher is an insurance fraud adjuster.

The searcher interacts with the searcher interface 101 to make selections from metadata 102A included in the data store 102B. The metadata 102A is a lexicon or vocabulary associated with a particular industry (e.g., legal, health care, engineering, politics, etc.). The metadata 102A may include a topology and synonyms and a variety of other custom defined relationships between terms and phrases associated with a particular industry. Thus, the metadata 102A may be customized to a specific industry. Moreover, the metadata 102A maps to fields of a data store table included within the data store 102B. The data store 102B houses information about an industry or enterprise.

The data store 102B may be a database (relational or OO) and/or a collection of disparate databases organized as a data warehouse. In an embodiment, the data store 102B is the Teradata Warehouse® distributed by NCR Corporation of Dayton, Ohio. Of course it is appreciated that the data store 102B may be any type of commercially available data store 102B, open source data store 102B, or custom-developed data store 102B.

It is appreciated that the metadata 102A is depicted in FIG. 1 as being included within the data store 102B. This is done to illustrate the mapping between items in the metadata 102A and their association to fields of other data store tables included within the data store 102B. However, in some cases the metadata 102A may reside outside the data store 102B.

The searcher interface 101 interacts with the search query generator 103. The search query generator 103 may be viewed as a primary OO class for the query generator and results set manager system 100. There is a single search query generator 103 instantiated each time a request for a search query is received from the searcher interface 101. Each instance of the search query generator 103 is thread-safe; meaning that as the searcher interface 101 invokes the search query generator 103, each newly created instance performs all of its data processing within its own thread of control. This is particularly beneficial in a distributed environment, where a variety of searchers may dynamically access the search query generator 103 and results set manager system 100 over a network, such as the Internet. For example, in web applications, when multiple users execute the same function at the same time, there is potential for the multiple calls to affect each other (or cross-pollinate). In this case, variables from one user's query could be used inadvertently to generate another user's search—making that search most likely not work as intended. Thread Safety prevents this from happening.

In an embodiment, search query generator 103 supports two methods a constructor method and a generate query language method. The constructor, which is thread safe, instantiates an instance of the search query generator 103 and accepts input parameters. Some example input parameters include attributes associated with the searcher, such as initials, searcher identification, and other information that assist in creating thread-safe instances of the search query generator 103. The constructor is called by the searcher interface 101. The generate query language method performs operations needed to generate a query in a query language recognized by the data store 102B. The instances of the generate query language method at some point in processing call the search query populator 108 (discussed below in detail).

For purposes of continuing to discuss FIG. 1 and the various components it is assumed that the data query language that is being generated is SQL (Structured Query Language). It is understood that this is done for purposes of comprehension and that embodiments presented herein are not specifically limited to the SQL database query language. Moreover, names of variables presented herein are also done by way of illustration and should not limit the teachings presented herein. Further, the term "searcher" may be used interchangeably with term "user" in the descriptions that follow.

Various stages of the search query generator 103 will consume a number of attributes, some attributes may include:

Query SQL—holds the final SQL for the query.

Report SQL—holds the final SQL used to retrieve the result set data properly ordered and sorted.

Result Set Table name—generated name for the result set.

Result Set SQL—SQL used to create or generate the empty result set.

For Tables List—array list of all tables/views referenced by both selection criteria and query columns 105.

Query Columns List—array list of all columns selected in the query.

Query Object—references query information needed to generate the query SQL.

Criteria Groups—array list of criteria groups 106 (containing selection criteria).

The inputs to the search query generator 103 function are:

String SiUserMetaDatabase—name of the searcher's metadata 102A

String siUserLoginId—searcher login name.

String queryId—id of the query for which SQL is being generated

String queryName—name of the query.

String Data Source—data source passed, such as from the web page, taken from a searcher's HTTP session.

String Case ID—id of the matter or case to which the query belongs as is defined by the searcher. In other words, the searcher may define a matter or case id, such as an insurance fraud case for health care.

Copyright 2005© NCR Corp., All Rights Reserved.

These parameters are passed into the constructor method (SqlGenerator) of the search query generator 103:

SqlGenerator mySqlGenerator= new SqlGenerator(siUserMetaDatabase, siUserloginId, queryId, queryName, dataSource, caseInfoId);

Copyright 2005© NCR Corp., All Rights Reserved.

Once the SQL is generated, there are three primary outputs of the search query generator 103:

The query entry is updated in the data store 102B to include the generated Query SQL.

A result set info entry is created, which includes a generated ID, Tablename, URL (Uniform Resource Locator if applicable), and the generated report SQL.

An empty result set table is created.

Updating the Query

Query table in the user's metadata database, indexed by the Query ID, is updated so that the QuerySQL attribute contains the generated query SQL.

Updating the ResultSetInfo Table

The ResultSetInfo table in the user's metadata 102A contains an entry representing the query result set table being created by the search query generator 103. If this is the first time this query has been executed, the search query generator 103 will need to create a new resultSetInfo entry. Otherwise the search query generator 103 will have to retrieve the one and only resultSetInfo entry for the specified query.

ResultSetInfo entries are populated as follows:

ResultSetInfoID: For new result sets, this is generated as: "RS_"+a generated ID, i.e. "RS_0000001233"

ResultSetTableName: For new result sets, this is generated as: "RS_"+a generated ID. i.e. "RS_0000001234"

The URL of the result set (used in the navigation tree) is: "resultset.do?siUserMetaDbName=<users metadata dbname>+"&resultSetInfoId="+<new result set ID>. Here's an example:

Resultset.do?siUserMetaDbName=bjw_pb&resultSetInfoId=RS_000000123 3

Result Set Name: This is the QueryName+"Result Set", as in "Brian's Cool Query Result Set"

Report SQL: Set to the generated report SQL

Case Info Id: Set for new records to the case to which the query belongs (this is input to the SQL Generator!)

ResultSetRowCount—always set to 0.

Copyright 2005© NCR Corp., All Rights Reserved.

Creating the Empty Result Set Table

Using the result set tablename generated above, create the table to match the results returned from the query. This is done by encapsulating the query select SQL into a special create table statement, using the following syntax:

Create multiset table Custom Table as (<generated query SQL>) with no data;

Copyright 2005© NCR Corp., All Rights Reserved.

Note: the table is created as a multiset table so that duplicate rows will be included in the result set (per customer request).

Return Values

TRUE if SQL was generated, and the above steps completed successfully.

FALSE and/or an Exception if problems are encountered.

Loading the Query 104—the Query Classes

This section describes the process for loading and storing in memory the query and all related query data.

Retrieval from the Data Store 102B

The query 104 and query column data 105 are retrieved from the user's siUserMetadatabase (metadata 102A) by using the provided queryId (an input to the search query generator 103). The data is loaded first from the QUERY table, then from the QUERYCOLUMN table—both by searching for the specified queryId. The data for the query 104 and query columns 105 will be retrieved from the user's siUserMetaDatabase—the user's metadata 102A, i.e. "bjw_pb"—that is an input parameter for the search query generator 102A.

Query Class

The query information is stored into the Query Class. For each pass of the search query generator 103, only a single query object 104 will exist. Information retrieved from the QUERY table includes all settings that apply or affect the entire query, including:

Sample Settings.

Rank or Threshold Settings.

Whether the query is filtering (or selecting from) a previous result set, and if so, which result set table.

Query Column Class 105

The query columns 105 represent the list of columns the users wish to see in their result set. These columns include both columns from defined tables, as well as aggregation columns and ranked columns. Query columns 105 also define the order in which columns are displayed in the result set, and the order in which results are sorted. These latter items are used to generate the report SQL that correctly sorts and orders the result set data.

A query column object 105 is instantiated for each query column retrieved from the data store 102B. There will usually be several query columns 105 defined in each query 104. These query column objects 105 are stored in an ArrayList attribute of the search query generator 103.

Loading the Selection Criteria

This section describes the process for loading and storing in memory the selection criteria groups and criterion line data.

Retrieval from the Database

In the data store 102B, each Query 104 has a single criterion object, which in turn has multiple criterion line entries. Each criterion line entry is further divided into a criterion group 106 entry. When retrieving this data from the data store 102B, select all criterion line entries belonging to the criterion 107 that is associated with the query ID provided as input parameter. There will be a single criterion associated with each query 104. The criterion line entries are sorted by the criterion group name 106.

Once the criterion lines have been selected, loop through the criterion line entries—every time a new criterion group 106 is encountered, a new criterion group object 106 is instantiated and added to the search query generator class 103. Criterion line objects are then instantiated and added to this criterion group object 106 until a new criterion group name 106 is encountered. This enables all criterion line objects to be added to the correct criterion group 106. Loading and properly building the criterion group 106 and criterion line entries is used for correctly generating the SQL.

Criterion Group Class 106

A criterion group object 106 groups together a collection of criterion line entries that should be processed together. When generating the WHERE clause of the query SQL, each criterion line will be joined with the Boolean AND operator with other criterion line entries in the same criterion group 106.

The contents of different criterion groups 106 are later joined with the Boolean OR operator.

The criterion group 106 class is capable of returning a SQL clause for all criterion 107 in the criteria group 106. It may also include validation routines.

Criterion Class 107

A criterion object 107 represents a single selection criterion statement. It includes a table or view and a column, an operator, and 1 or 2 values. (Note: The value can actually be a list of values—when the IN or NOT IN operators are used, the "value" field will be a comma-separated list of items.) A criterion object 107 also includes other information required to correctly generate the SQL fragment including the data type of the underlying column, whether or not the criterion 106 should compare values IN or NOT IN another result set table.

The search query populator 108 may be viewed as an extension of the search query generator 103. In other words, in some embodiments, the search query populator 108 and the search query generator 103 may be the same entity or object class. In other instances, it is useful to have as separate entities for purposes of treating the search query populator 108 as a data access layer to the data store 102B.

The search query populator 108 and/or search query generator 103 use the information discussed above to dynamically create search queries in a data language format (e.g., SQL, etc.) of the data store 102B. These various operations include, generating queries, custom ranking results, custom filtering results, selecting random samplings of results (discussed below with respect to FIG. 2), and searcher-supplied custom aggregations. These operations will now be discussed.

This section reviews the various processing algorithms used to meet the functional requirements of the SQL Generator.

Generating the Search Query (SQL)

Once SQL Generation begins, all query 104 and query columns 105, and criterion groups 106 and criterion 107 have been loaded for the specified query, and the list of "From" tables have been built as the various pieces were loaded. The list of "from" tables represents all tables or views that are referenced in the criteria 106, or in the query columns 105, that ultimately need to be included in the FROM clause of the SQL statement.

The algorithm for generating the SQL statement may be broken down into four steps:

1. Build the SELECT clause.
2. Build the FROM clause.
3. Build the WHERE clause.
4. Add a GROUP BY clause if necessary.

Building the SELECT clause.

When building the SELECT clause, the goal is to select the columns specified by the user in the query columns 104. This means just looping through the query columns 104 and adding the columns. Aggregated columns will be discussed herein and below.

However, the very first column is a special column generated by the search query generator 103 and/or the search query populator 108. The purpose of this first column is to serve as the primary key of the result set table, and to promote an even distribution of the result set across the data store 102B. Without this column, the first column specified by the user would be used as the primary key of the table—affecting the distribution of the result set data. If this column were something with a small number of possible values—such as gender (with 2 (binary) values: M or F), the distribution of data would be highly skewed across a small number of data store 102B processing engines, and would not leverage the parallel nature and scalability of the data store 102B.

The first column uses a hash function (HASHROW), and is built using the query columns 105 that do not use an aggregation function. The first step then is to build a list of all non-aggregate columns. This is a comma-separated list, built by looping through the query columns 105 and adding each non-aggregate column to this list. Once this list is built, the SQL for the first column is:

HASHROW(<list of non-aggregate columns>) AS PI,

This column may and most probably will be omitted from the report SQL later, as it is not included in the data retrieved for users in reports.

Once the HASHROW column has been created, completing the select statement is next. Just loop through each column, get the column name, and keep separating them by columns. The final select statement for a query with 3 non-aggregate query columns is:

SELECTHASHROW(col1, col2, col3) as PI, col1, col2, col3

If the second column were an aggregate column (discussed below), this would change the HASHROW as follows:

SELECT HASHROW(col1, col3) as PI, col1, col2, col3

Building the FROM Clause

The FROM clause of the query SQL lists tables/views referenced in either a query column 105, or in the selection criteria. As these are retrieved from the data store 102B and loaded into the search query generator 103 and or search query populator 108, each new table/view name is stored in the list of "FROM" tables.

If, however, users are selecting data from a previously defined result set, then the query columns 105 and columns referenced in selection criteria will reside in the result set. In this instance, the contents of the "FROM" tables list is reset to include only the single source result set, and a validation method is called to make sure that all columns referenced in query columns 105 and in criteria do come from this table—an exception is generated if this is not the case.

The resulting FROM clause should look like:

FROM <dbname>.<tblname1>

Setting the Database Name

When it comes to generating the FROM clause, the goal is to generate a fully qualified table/view name. When selecting from the standard searcher interface 101 tables, the user's "view" database name is used. If the query selects from a source result set instead, then this result set resides in the user's "siUserMetaDatabase".

Setting the Table Name

In an embodiment, there is a single table in the FROM clause. Anytime users reference more than one view in a query, the search query generator 103 and/or search query populator 108 may instead use an "ALL_CATEGORIES" view, which is a composite view that joins all underlying views and tables.

In an alternative embodiment, a metadata structure is used to hold table join mappings. Thus, a plurality of tables may be used in the FROM clause.

Four possibilities for the tablename include:

1. If the query references a source result set, there will only be a single table in the FROM list that will correspond to the source result set table. Note: source result sets will be found in the user's siUserMetaDatabase (metadata 102A).

2. If they aren't using a query result set, but there's still only a single table referenced, use that single table. This table (or view) will reside in the user's view database.

3. If they aren't using a query result set, but multiple tables are referenced, the query SQL may instead reference only the "ALL_CATEGORIES" view.

4. If they are using multiple tables a metadata structure is used to hold table join mappings.

Building the WHERE Clause

The selection criteria have already been segregated into appropriate groupings by the user (and already loaded into corresponding criteria group objects 106 internally). The rules for generating the WHERE clause are:

1. Selection criteria within a criteria group 106 are joined together by a Boolean "AND" operator.

2. Selection criteria within different criteria groups 106 are joined together by a Boolean "OR" operator.

Example selection criteria may be as follows:

Group 1

Drug Code=54

CLAIM Type=INST

The where clause will look like:

WHERE (drg_cd='54') AND (claim_typ='INST')

Another example:

Group 1

Drug Code LIKE 5%

Group 2

Drug Code LIKE 3%

The where clause will look like:

WHERE (drg_cd LIKE '5%') OR (drg_cd LIKE '3%')

In summary, the following occurs:

1. Loop through the Criteria Groups 106.

2. Loop through each criteria within a criteria group 106, joining multiple criteria w/the AND operator 3. Build the selection criteria condition and put in parenthesis—this may be handled by the Criteria GenSql( ) method (discussed below).

4. Join the SQL returned by each criteria group 106 with an OR operator (and put in parenthesis)

GenSql( ) Method

Each Criteria object has all of the information it needs to generate a correctly formed SQL fragment, including the column name, table/view name, operator, value(s), and a data type. Here are some rules for building the SQL fragment for the criteria: In the examples that follow, "<col>" denotes the actual name of the column; actual examples of what would be in the corresponding criteria fields are shown; and "IN/NOT IN" shown in the table below are for standard selection criteria. Comparisons—i.e. searching for value IN/NOT IN another result set—are discussed separately.

| Operator | Value1 | Value2 | SQL |
|---|---|---|---|
| = | 4 | N/A | (<col> = 4) |
| <> | 4 | N/A | (<col> <> 4) |
| >, >= | 4 | N/A | (<col> >= 4) |

-continued

| Operator | Value1 | Value2 | SQL |
|---|---|---|---|
| <, <= | 4 | N/A | (<col> < 4) |
| LIKE | 4% | N/A | (<col> LIKE '4%') note: only valid for CHAR/VARCHAR datatypes |
| BETWEEN | 01/01/2002 | 01/01/2003 | (<col> BETWEEN '01/01/2002' AND '01/01/2003') |
| NOT BETWEEN | 01/01/2002 | 01/01/2003 | (<col> NOT BETWEEN '01/01/2002' AND '01/01/2003') |
| IN | A, B, C, D, E | N/A | (<col> IN ('A', 'B', 'C', 'D', 'E')) |
| NOT IN | A, B, C, D, E | N/A | (<col> NOT IN ('A', 'B', 'C', 'D', 'E')) |

Data Type Issues

The data type of each column represented by a criteria object is known, and is part of the criteria definition. The data type of the column determines whether or not the values have to be surrounded by single quotes.

DATE, CHAR, and VARCHAR columns have values surrounded by single quotes, as in <col>='abracadbra'. Other data types do not surround the values with single quotes.

Most of the time, this is a fairly straightforward process of building the SQL string either with our without single quotes around the value. However, in the case of the "IN/NOT IN" operator, the "Value"—which is really a list of values—is parsed to correctly surround all values with quotes.

Filtering a Result Set

A result set is an answer set that returns from an executed search query against the data store 102B. Comparisons are used when users have created a result set that has a specific list of values. They can then use this list of values to help filter a current result set. Here's and example as to how this may get generated: In the example, the InsourceID1 table holds the actual result set tablename of the result set that is being used to filter results. Furthermore, in the example, users have used another query to generate a list of drug codes—the results of this query are defined in result set table 'RS_0000001234'

| Operator | InsourceID1 | SQL |
|---|---|---|
| IN | RS_0000001234 | <col1> IN (SELECT col1 FROM RS_0000001234) |
| NOT IN | RS_0000001234 | <col1> NOT IN (SELECT col1 FROM RS_0000001234) |

When using this comparison, the criteria column name is the same as the column name in the result set table. For example:

WHERE (drg_cd IN (SELECT drg_cd from RS_0000001234)

User Specified Aggregations

On any query column, a user can apply an aggregation function. These aggregations include: SUM, AVG, MIN, MAX, COUNT, and COUNT DISTINCT. The algorithm for applying these aggregations is an addition to the overall algorithm of generating the query SQL.

When an aggregation is encountered, 3 things happen during SQL Generation:

1. Apply the aggregation function using the appropriate data store 102B optimized SQL function.

2. Generate a new name for the aggregation column [and use this name when building the SQL that selects the query results from the result set table].

3. Append a GROUP BY clause to the query SQL statement.

The following table states how the first two steps above are done. In the table "<colname>" represents the actual name of the column

| Aggregation | Column Name | Column SQL |
|---|---|---|
| SUM | S_<colname> | SUM(colname) AS S_<colname> |
| AVG | A_<colname> | AVG(colname) AS A_<colname> |
| MIN | MN_<colname> | MIN(colname) AS MN_<colname> |
| MAX | MX_<colname> | MAX(colname) AS MX_<colname> |
| COUNT | C_<colname> | COUNT(colname) AS C_<colname> |
| COUNT DISTINCT | CD_<colname> | COUNT(DISTINCT(colname)) AS CD_<colname> |

CD stands for count distinct or count unique; meaning that unique items are counted and not repeated items.

Modification to the Query SQL Generation Algorithm to Support User-Specified Aggregation When generating the query SQL, if a query column uses an aggregation function, the column SQL listed above is used instead of a column name. Additionally, the column name as it will appear in the result set table is saved, so that it can be used when any report SQL is generated.

Adding a GROUP BY Clause

Whenever aggregation functions are used in the data store 102B SQL, a group by clause may be added to the SQL statement. In this case, when aggregations are used, a GROUP BY clause is added to the query SQL statement. The GROUP BY clause includes every column (including the first HASHROW column) that does not use an aggregation. Thus, if there are 4 columns and the second column is an aggregation, a GROUP BY clause is appended to the SQL statement, as in:

GROUP BY 1, 3, 4

If no aggregation methods are used in the query SQL, no group by clause has to be generated.

Sorting Results and Ranking Results

This method supports sorting query results according to user-specified sorting standards. This function actually does two things. First, it builds a SQL statement that selects the results from the result table generated by the query SQL. In this step, the SQL statement selects the columns in the order specified by the user. Secondly, this algorithm applies the sorting specified by the user. On any and all columns that users include in the query, they can choose to apply sorting. The sorting can be either in an ASCENDING or DESCENDING order.

Building the Report SQL

The first step is the correctly build a SELECT SQL statement that will retrieve the query results from the result table. The column order matches that which was specified by the user when defining the query columns 105 (these are attributes of the Query Column 105 class). The column names referenced in this SQL statement match the column names as they were created in the result set table. In some cases—notably when aggregation functions are used—these will be different.

In this step, the SELECT statement is built by looping through the query columns 105, and calling the method "genRsColName( )"—which returns the name of the query column 105 as it appears in the result set table. At this point, the select SQL statement looks like:

SELECT<col1>, <col2>, <col3> . . .

In selecting the result sets, the first column—the HASHROW column that was created to promote an even distribution of the data—is omitted. Users generally will not see this column.

The next step is to add the result set tablename in a FROM clause—the result set table will always reside in the user's SIMetaDatabase—i.e. "bjw_pb".

Building the ORDER BY Clause

The final step is to apply the user-specified sorting. Each QueryColumn has a SortOrder attribute. In this step, the code loops through all query columns finding the lowest SortOrder. Once the lowest has been found, the column order is added to the ORDER BY clause, the ordering is applied, and the algorithm loops back to find the next lowest sort order. This continues until all of the sorting has been applied for each column.

In applying the sorting algorithm, each column can be sorted in either an ASCENDING or DESCENDING manner. In an embodiment, the data store's 102B, DESCENDING sorting is the default, but ASCENDING sorting requires additional qualification, as in this example:

ORDER BY 1, 4 ASCENDING, 2 ASCENDING, 3

In this example, columns 1 and 3 are sorted in a DESCENDING manner which is the default sort order in the above-mentioned embodiment for the data store 102B.

Once the ORDER BY clause has been added to the SQL, the processing is complete.

Filtering Results Sets to Generate Subsets of Data

When users choose to create a new query that runs against the output (result set) of another query, rather than against the source data store 102B, the query is directed against this type of query processing instead. This is done primarily during the loading of the query, query columns 105, and criteria lines. In the query, there is a Boolean indicator in the table that states whether or not a query uses a result set table. If this is TRUE (1), then there will also be a result set tablename defined. The remainder of the generated SQL remains the same, as if users were querying historical data instead of a query result set.

The methods to load the query, query columns 105, and query criteria may each call the method AddFromTbl( ) to add tables to the list of from tables. This method will always check to see whether or not the query uses a result set table. If it does, the AddFromTbl( ) method will only add the result set table to the from table list—as all other columns and criteria exist in this result set table. Basically, this will be the only table in the list of "FROM" tables, so the query will be directed solely against this source result set—instead of against the historical data. The result set of the query then will be a subset of the original result set data.

Validation Checks

Because the result set table is used as the "source" table for the query, all query columns 105 and criteria columns exist in this result set table. The Validate( ) method checks for this condition, and throws an exception if a column referenced as a query column 105 or as a criterion column does not exist in the source table.

It is noted that once the query is generated and an empty results set data structure created (initially null), the query may be immediately executed or scheduled for subsequent execution. Once the query is executed, the results of the query are populated to the results set data structure and are available for further management and analysis as is described herein.

It has now been demonstrated how the query generator and results set manager system 100 may be organized and processed for purposes of automatically generating search queries and permitting a variety of other beneficial processing, such as aggregations, ranking of results sets, sorting of results sets, and filtering results sets.

Figure 2:
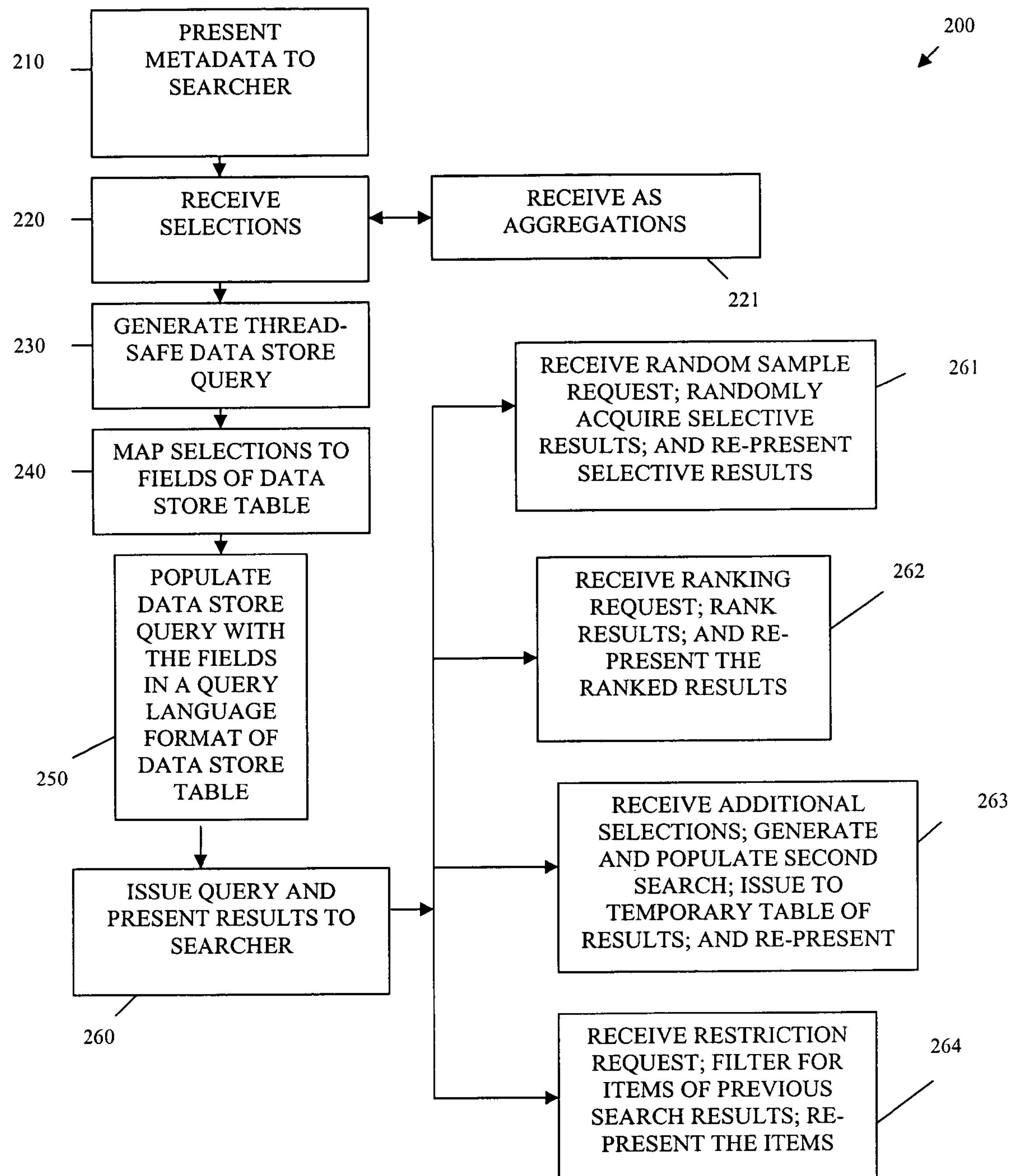
FIG. 2 is a diagram of a method for automatic query generation and results set management, according to an example embodiment.

FIG. 2 is a diagram of a method 200 for automatic query generation and results set management, according to an example embodiment. The method 200 (hereinafter "query service") is implemented in a machine-accessible and computer readable medium. In an embodiment, the query service represents processing performed by a variety of the components of the query generator and results set manager system 100 of FIG. 1.

In an embodiment, the query service is implemented as instructions and those instructions may be downloaded or uploaded to a machine and processed. For example, the query service may be implemented on a removable media, such as a compact disk (CD) and interfaced to a media bay of a machine, uploaded, and processed. In another embodiment, the instructions are downloaded from a remote site to the machine and processed. In still another embodiment, the instructions are pre-packaged with other instructions or fabricated within storage and/or memory of a machine.

At 210, the query service presents metadata to a searcher. In an embodiment, the searcher interface 101 of FIG. 1 may be an entity that does this and interacts with the searcher. The metadata includes a lexicon associated with a particular industry of the searcher and includes search operands. In an embodiment, the search operands are separate from the metadata and are manually supplied or selected by the searcher for communication to the query service.

At 220, the query service receives selections from the searcher of the metadata. The selections include search operands and other attributes the searcher may wish to communicate, such as a case or matter id, etc. In an embodiment, at 221, some of the selections are recognized as aggregations (e.g., SUM, AVG, MIN, MAX, COUNT, and COUNT DISTINCT, etc.).

The query service, at 230, generates a thread-safe data store query. This means the execution space for the data store query is unique and will not collide with other instances of data store queries that may concurrently process against the data store.

Next, at 240, the query service maps selections of the metadata to fields of a data store table. The data store table may be a permanent table residing within the data store or may be a temporary table that houses previously acquired results sets from a previously executed query against the data store.

At 250, the query service populates the thread-safe data store query with the fields in a query language format associated with the data store table. In some embodiments, this query language format or interface is SQL.

In an embodiment, at 260, the populated thread-safe data store query is issued and processed against the data store table. The results or results set from the executed query are presented to the searcher. At this point, the searcher may perform a variety of results set management operations against the query results.

For example, at 261, the query service may receive a random sampling request from the searcher. The random sampling request may include a raw number or a percentage. This tells the query service to use a random number generation service to acquire a random number of the query results or to acquire a random percentage of the results. The randomly filtered query results are then presented to the searcher.

In another example, at 262, the query service may receive a ranking request associated with conditions supplied by the searcher. The query service applies these conditions to the query results and re-presents the newly ranked query results to the searcher.

In yet another example, at 263, the query service may receive additional selections associated with metadata of the query results. In response to this, the query service may populate a second data store query and issue the second data store query against a temporary data store table that houses the query results. Next, the new query results associated with executing a new search against the original query results are re-presented to the searcher.

In still another example, at 264, the query service receives a restriction requirement which requests a customized filter against the query results. In some cases, this may include comparing overlapping items that appear in the query results against other previously executed query results and re-presenting to the searcher the overlapping items that appear in both. Another related filter may be to present items that appear in the original query results but not the previous query results, or vice versa.

Figure 3:
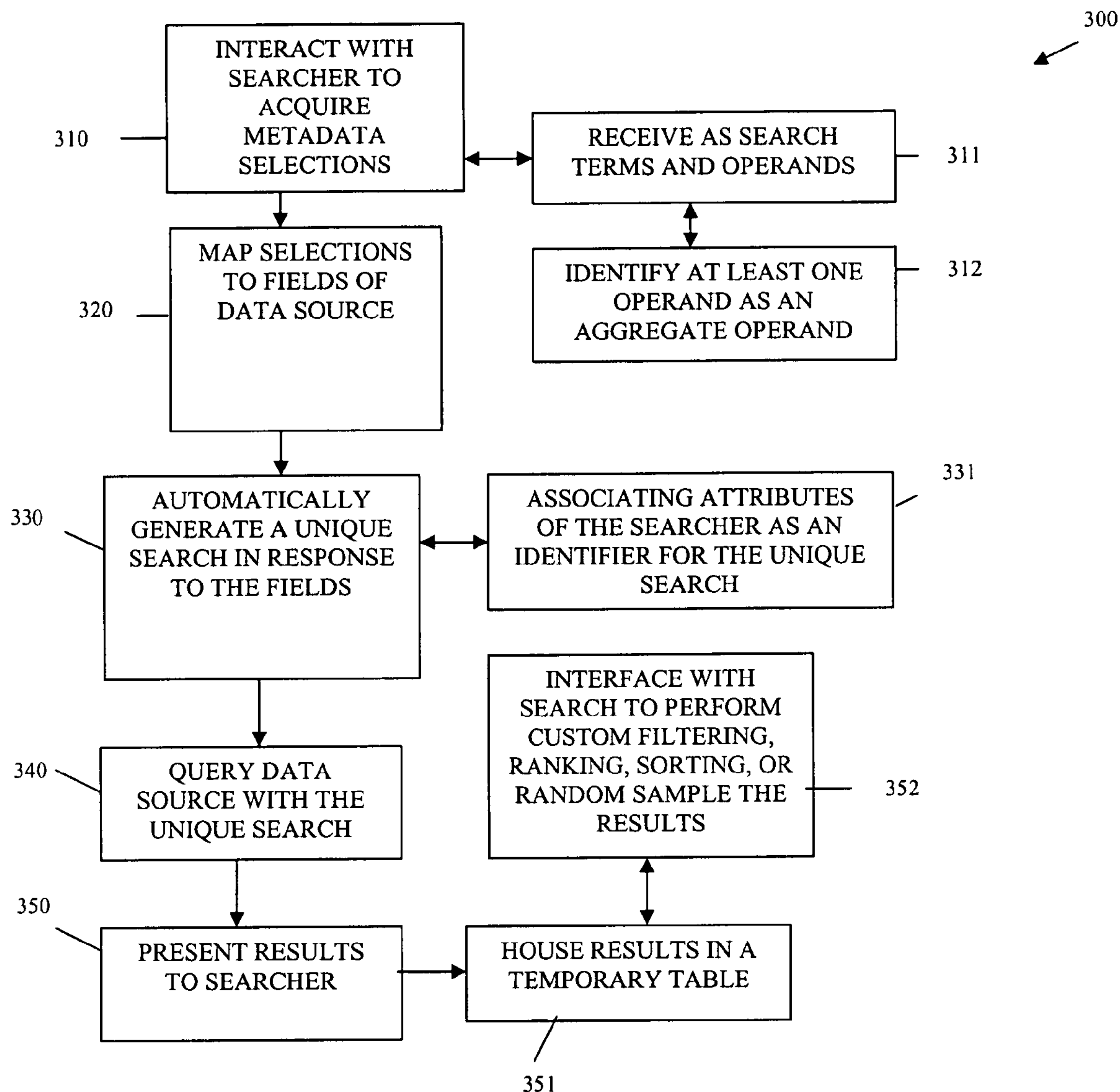
FIG. 3 is a diagram of another method for automatic query generation and results set management, according to an example embodiment.

FIG. 3 is a diagram of another method 300 for automatic query generation and results set management, according to an example embodiment. The method 300 (hereinafter "modified query service") is an alternative view of the processing associated with the query service represented by the method 200 of FIG. 2. The modified query service is implemented in a machine-accessible and computer-readable medium and is operationally accessible over a network. In an embodiment, the query service is available over the Internet or an Intranet to a searcher via a browser and the World-Wide Web (WWW).

Initially, at 310, the modified query service interacts with a searcher to acquire metadata selections. In an embodiment, at 311, the metadata selections include search terms and search operands. Again, the metadata represents an industry or topic specific lexicon. Moreover, in some cases, at 312, at least one of the operands may be recognized as an aggregate operand.

At 320, the modified query service maps the searcher-supplied metadata selections to fields of a data source. In an embodiment, the data source is a data store table from a data store (e.g., database, data warehouse, etc.). In another embodiment, the data store table is a dynamically generated or derived table acquired from a previous results set of a previous search query that executed.

At 330, the modified query service automatically generates a unique search in response to the fields and the data source. The search is unique to promote concurrent processing with multiple instances of the modified query service. It also ensures that collisions are avoided within the data source between two searches.

In an embodiment, at 331, the modified query service may use a variety of attributes associated with the searcher as an identifier for the unique search. For example, the searcher's id and individual case or matter reference numbers may be used to ensure uniqueness. Alternatively, a random number generator may be used to name the unique search. In fact, any naming convention that permits the search to be unique is intended to be covered by the embodiments presented herein.

At 340, the modified query service queries the data source with the unique search and at 350 the results (query results or results set) are presented to the searcher. In an embodiment, at 351, the query results are housed in a temporary table. This promotes results set management operations that may be custom defined and executed by the searcher that interacts with the modified query service.

For example, at 352, the query service may present operations to a searcher that permit the searcher to perform custom filtering against the query results, to perform custom ranking of the query results, to perform custom sorting of the query results, and/or to perform random sampling of the query results.

The processing of the modified query service occurs dynamically, in real time, and in an automated fashion. This facilitates improved analyst (searcher) interaction and permits analysts to timely implement searching against a data source, since a DBA is not needed for search queries to be constructed, executed, and the results managed.

Figure 4:
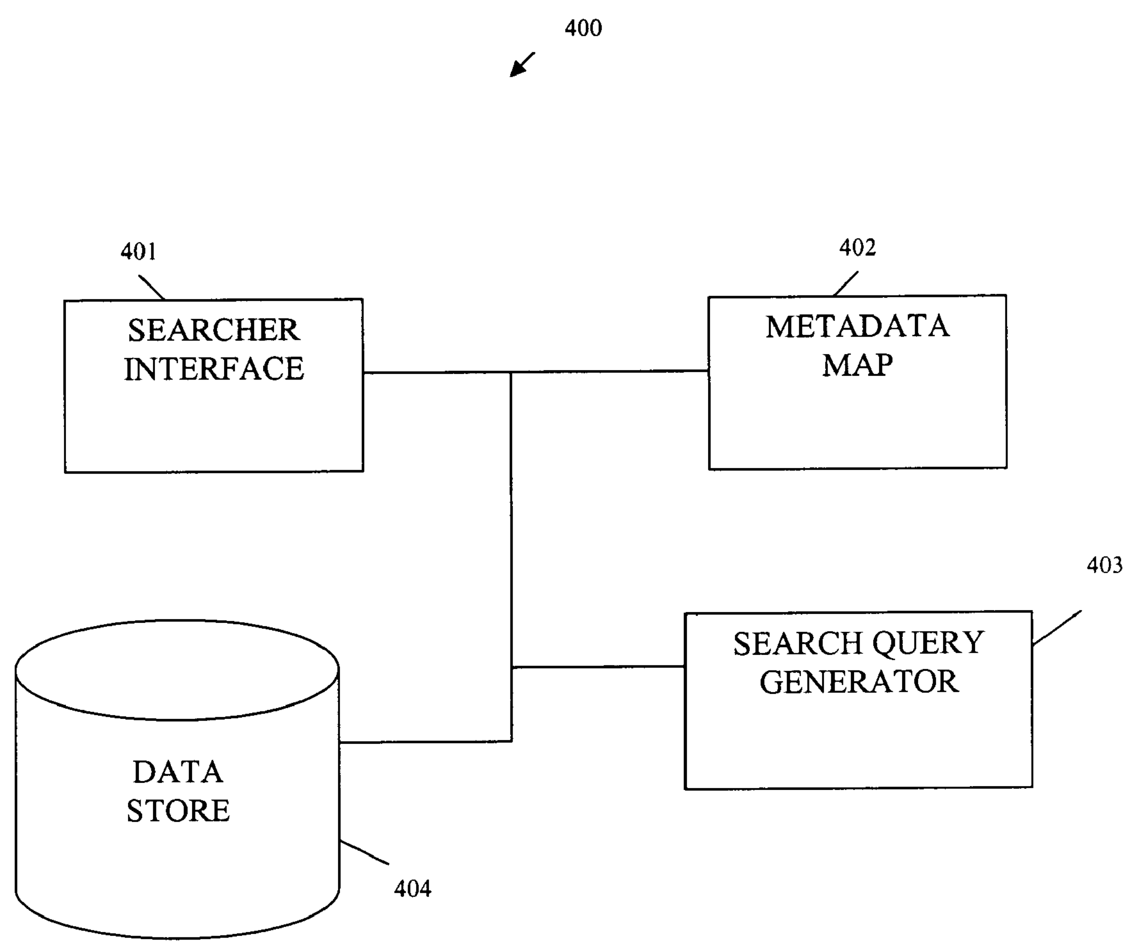
FIG. 4 is a diagram of another query generator and results set manager system, according to an example embodiment.

FIG. 4 is a diagram of another query generator and results set manager system 400, according to an example embodiment. The query generator and results set manager system 400 is implemented in a machine-accessible and computer readable medium and is optionally accessible over a network. The query generator and results set manager system 400 presents a modified view and alternative view of the query generator and results set manager system 100 presented above with respect to FIG. 1.

The query generator and results set manager system 400 includes a searcher interface 401, a metadata map 402, and a search query generator 403. In an embodiment, the query generator and results set manager system 400 also includes a data store 404.

The searcher interface 401 interacts with a searcher, metadata, and the search query generator 403. The searcher interface 401 receives selections from the metadata. The metadata is associated with a particular topical or industry-specific lexicon and includes search terms and/or search operands. In an embodiment, the lexicon is associated with insurance health care claims data.

A searcher interacting with the searcher interface 401 may also provide values for search terms. In some cases, a number of the search operands may include or be augmented by the searcher to include aggregate operations, such as a sum operation, an average operation, a minimum operation, a maximum operation, a count operation, and a count distinct or count unique operation.

In still another embodiment, the searcher interface 401 may also include results set operations for communicating customized query result ranking, sorting, filtering, and/or random sampling of the query results. The results set operations are performed by the search query generator after a search is executed against a data store 404.

The metadata map 402 includes mapping from a number of the lexicon-specific terms or phrases to specific fields of data store tables. The tables may be housed in the data store 404 or may be the result of dynamic generation. The metadata map 402 may also reside in the data store 404 or it may external to the data store 404.

The search query generator 403 dynamically and in real time interacts with the searcher interface 401 for purposes of receiving metadata selections and/or results set operation requests. In response to the metadata selections, the search query generator 403 generates a thread-safe or unique search query having fields from a data store table. The fields are acquired from the metadata map 402.

When instructed, the search query generator 403 may also assist in executing the search query against the data store table. The results set returned may then be assembled in a temporary data store table and used to execute any customized filtering, sorting, ranking, and/or random sampling against the query results.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72 (b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable storage medium and configured to be processed by a computer, comprising:

presenting metadata to a searcher, wherein the metadata is associated with a lexicon for a particular industry;

receiving selections of the metadata from the searcher, wherein the metadata includes a topology and synonyms and custom defined relationships between terms and phrases associated with a particular industry, and wherein the metadata includes search operands to use with the terms and phrases;

generating a thread-safe database query by using the selections as input parameters and generating the thread-safe database query as an Structured Query Language (SQL) query, wherein in building the thread-safe database query a select clause, a from clause, a where clause, and a group by clause are automatically generated, and wherein the thread-safe database query performs its data processing within its own thread of control and an execution space of the thread-safe data store query is unique and does not collide with other instances of database queries that concurrently process with the thread-safe database query, the input parameters including a login name for the searcher, matter identifier, a data source reference, a name for the thread-safe database query, and a name for metadata associated with the searcher;

mapping the selections to fields of a database table; and populating the database query with the fields in a query language format of the database table in a results set table that is validated before it is presented to the searcher to ensure that query columns used in the search exist in the results set table.

2. The method of claim 1, wherein receiving further includes receiving a number of the selections as aggregations.

3. The method of claim 1 further comprising:

issuing the database query to the data store table; and presenting results associated with the database query to the searcher.

4. The method of claim 3 further comprising:

receiving a random sampling request from the searcher;

randomly acquiring a number or a percentage of the results in response to the random sampling request; and re-presenting the number or the percentage of the results to the searcher.

5. The method of claim 3 further comprising:

receiving a ranking request from the searcher;

ranking the results in response to the ranking request; and re-presenting the results in a ranked order.

6. The method of claim 3 further comprising:

receiving additional selections from the searcher for metadata associated with the results;

generating a second database query;

populating the second database query in the query language format;

issuing the second database query against a temporary database query table, which houses the results; and re-presenting, to the searcher, sub-results associated with searching the results with the second database query.

7. The method of claim 3 further comprising:

receiving a restriction request from the searcher;

filtering the results for items included in the results that were associated with a previous database query's results in response to the restriction request; and re-presenting the items to the searcher.

8. A method implemented in a computer-readable storage medium and configured to be processed by a computer, comprising:

interacting with a searcher to acquire metadata selections for a search query, wherein the metadata selections include a topology and synonyms and custom defined relationships between terms and phrases associated with a particular industry, and wherein the metadata selections include search operands to use with the terms and phrases, the metadata selections including a login name for the searcher, matter identifier, a data source reference, a name for the thread-safe database query, and a name for metadata associated with the searcher;

mapping the metadata selections to fields associated with a database;

automatically generating a unique search in response to the fields, wherein the unique search is generated to be a thread safe search and the unique search is a Structured Query Language (SQL) search, and wherein in generating the unique search a select clause, a from clause, a where clause, and a group by clause are automatically generated;

querying the database with the unique search, and wherein the unique search performs its data processing within its own thread of control and an execution space of the unique search is unique and does not collide with other instances of database queries that concurrently process with the unique search; and presenting results associated with querying to the searcher in a results set table that is validated before it is presented to the searcher to ensure that query columns used in the unique search exists in the results set table.

9. The method of claim 8, wherein interacting further includes receiving the search terms and the search operands with the metadata selections.

10. The method of claim 8 further comprising, identifying at least one of the search operands as an aggregate operand for at least one of the search terms.

11. The method of claim 8, wherein automatically generating further includes associating attributes of the searcher to an identifier for the unique search.

12. The method of claim 8 further comprising, housing the results in a temporary table.

13. The method of claim 12 further comprising, interfacing with the searcher to perform at least one of a customized filtering of the results, a customized sorting of the results, a customized ranking of the results, and a random sampling of the results.

* * * * *